United States Patent [19]

Annarelli et al.

[11] 4,379,132

[45] Apr. 5, 1983

[54] PROCESS FOR SODIUM HYPOPHOSPHITE

[75] Inventors: Dennis C. Annarelli, Newtown, Pa.; Richard E. Hall, Trenton, N.J.

[73] Assignee: FMC Corporation, Philadelphia, Pa.

[21] Appl. No.: 405,223

[22] Filed: Aug. 5, 1982

[51] Int. Cl.$^3$ .................. C01B 15/16; C01B 25/26
[52] U.S. Cl. .................. 423/305; 423/158; 423/181; 423/DIG. 14; 210/665; 210/667; 210/669; 210/687
[58] Field of Search ............. 423/158, 181, 305, 307, 423/304, 299, DIG. 14, 309, 308, 311; 210/665, 667, 669, 687

[56] References Cited

U.S. PATENT DOCUMENTS

| | | | |
|---|---|---|---|
| 2,045,097 | 6/1936 | Otting | 99/60 |
| 2,330,865 | 10/1943 | Butzler | 210/16 |
| 2,376,914 | 5/1945 | Gustafson | 210/24 |
| 2,701,791 | 2/1955 | Lindsay | 210/16 |
| 2,938,770 | 5/1960 | Pahud | 423/181 |
| 2,976,117 | 3/1961 | Pahud | 23/107 |
| 2,976,118 | 3/1961 | Pahud | 423/307 |

FOREIGN PATENT DOCUMENTS 2006632  3/1971  Fed. Rep. of Germany ...... 423/305

OTHER PUBLICATIONS

Zobel, D., "The Piesteritz Hypophosphite Process", *Chemisch-Technische Umschau*, 10(1), 73-79, (1978).
Mellor, *Inorganic and Theoretical Chemistry*, vol. VIII, Supp. III, Phosphorus, Wiley-Interscience, NY (1971), pp. 621-623.

*Primary Examiner*—O. R. Vertiz
*Assistant Examiner*—Jackson Leeds
*Attorney, Agent, or Firm*—Richard E. Elden; Frank Ianno

[57] ABSTRACT

Either commercial yellow phosphorus or a phosphorus sludge is reacted with a slurry of calcium hydroxide in aqueous sodium hydroxide to form a sodium hypophosphite solution containing calcium and hydroxide ions. The solution is neutralized with phosphoric acid or an acid phosphate salt with the co-production of an insoluble calcium phosphate. The neutral solution is contacted with an ion exchange resin charged with sodium ions to remove any remaining calcium ions.

14 Claims, No Drawings

PROCESS FOR SODIUM HYPOPHOSPHITE

This invention relates to a process for manufacturing sodium hypophosphite.

Sodium hypophosphite is a well-known commercial compound. The Kanign nickel plating process is a major consumer of sodium hypophosphite, according to Kirk-Othmer, *Encyclopedia of Chemical Technology*, 3rd Edition, Volume 8. New York: Wiley-Interscience (1979) page 741. In addition, Jadlocki, Jr. et al in U.S. Pat. No. 4,282,260 disclose the use of hypophosphites including sodium hypophosphite to inhibit the formation of enterotoxin in smoked meat products.

Sodium hypophosphite is generally produced by the disproportionation of elemental phosphorus in an alkaline solution with the formation of co-products phosphine, hydrogen gas, and sodium phosphite according to the following reactions:

$$P_4 + 3OH^- + 3H_2O \rightarrow 3H_2PO_2^- + PH_3 \quad (1)$$

$$P_4 + 4OH^- + 4H_2O \rightarrow 4H_2PO_2^- + 2H_2 \quad (2)$$

$$P_4 + 4OH^- + 2H_2O \rightarrow 2HPO_3^{-2} + 2PH_3. \quad (3)$$

At a high pH and at temperatures above 85° C., phosphite ion is also formed according to the following reaction:

$$H_2PO_2^- + OH^- \rightarrow HPO_3^{-2} + H_2. \quad (4)$$

Therefore, the undesirable phosphite is invariably formed as a by-product and its removal is always an important step in any hypophosphite manufacturing process.

As calcium phosphite is relatively insoluble while calcium hypophosphite is relatively soluble, most commercial sodium hypophosphite processes rely on precipitation of the undesirable phosphite as calcium phosphite. Pahud, in U.S. Pat. No. 2,938,770 discloses a process for purifying the alkali metal hypophosphite solutions by precipitating the phosphite as the calcium salt using calcium hypophosphite as the reagent. Pahud suggests the production of calcium hypophosphite by ion exchange treatment of sodium hypophosphite.

Zobel, in German Pat. No. 2,006,632, discloses the sodium hypophosphite process used by VEB Stickstoffwerk Piesteritz in which elemental phosphorus is reacted with a slurry of calcium hydroxide in sodium hydroxide. The source of the elemental phosphorus is either sludge from an electrothermal phosphorus plant or commercial yellow phosphorus. The slurry is subsequently filtered and the clear solution is neutralized with carbon dioxide to remove the excess calcium hydroxide as insoluble calcium carbonate. The calcium hypophosphite remaining in solution is removed by reaction with sodium carbonate to form insoluble calcium carbonate. Residual sodium carbonate in the solution is then neutralized to prevent by-product formation of more phosphite ion through reaction (4) above; hypophosphorous acid is used for this neutralization. The sodium hypophosphite solution so formed is then crystallized and separated from the mother liquor and dried conventionally.

In the process of the present invention it has been found possible to react the elemental phosphorus with the calcium hydroxide slurry in aqueous sodium hydroxide, filter the slurry, neutralize the calcium hydroxide in solution with phosphoric acid or an acid phosphate salt, filter the insoluble calcium phosphate formed from solution, and remove the residual calcium in solution by means of ion exchange.

Although the process can be used to purify an impure sodium hypophosphite, the process of the present invention is preferably carried out as part of the production of sodium hypophosphite from elemental phosphorus. Preferably, the initial sodium hypophosphite solution is obtained by the reaction of either commercial yellow phosphorus or phosphorus sludge with a slurry of calcium hydroxide in a sodium hydroxide solution. The proportions of calcium hydroxide and sodium hydroxide should be such that the ratio of hypophosphite ion to sodium ion in the slurry from the first step is greater than the stoichiometric relationship, that is, when the reaction with phosphorus is complete there is a slight excess of calcium hypophosphite in solution and usually an excess of calcium ion as calcium hydroxide is also in the solution.

The preferred process of this invention is to monitor the pH of the solution containing sodium hypophosphite and calcium ions as impurities and to adjust the pH of the solution to between 6.5 and 7.0 using phosphoric acid or an acid phosphate salt, such as sodium acid pyrophosphate or sodium dihydrogen phosphate. Preferably, phosphoric acid is used to adjust the pH. This pH adjustment neutralizes any hydroxide ions in the solution and precipitates the equivalent calcium ions as an insoluble calcium phosphate. The neutralized solution is then separated from the insoluble calcium phosphate salt, for example by filtering or centrifuging, and the separated solution is then contacted with a cation type of ion exchange resin charged with sodium ions thereby producing a solution of sodium hypophosphite essentially free from calcium. The resin may be a strong acid type, such as a sulfonic acid resin widely used in water softening; or it may be a weak acid type resin, such as a carboxylic type resin in the sodium form. The sulfonic acid type of resin can be regenerated with a sodium chloride brine solution; regeneration of the carboxylic type resin may be accomplished by treating with acid, such as dilute hydrochloric acid, followed by dilute sodium hydroxide solution.

The following non-limiting examples will further illustrate the process of the present invention.

EXAMPLE 1

A. A suspension of sludge from an electrothermal phosphorus plant containing 10.9% elemental phosphorus was reacted with a slurry of lime in aqueous sodium hydroxide; the Na/P mol ratio was 0.1 and the Ca/P mol ratio was 0.6. A 33% yield of a hypophosphite solution was recovered after filtration. The product assayed 5.46% hypophosphite and contained 0.03% phosphite. The pH of the solution was 11.9.

B. Commercial yellow phosphorus was reacted with a slurry of lime in aqueous sodium hydroxide in which the Na/P mol ratio was 0.3 and the Ca/P mol ratio was 0.51. The hypophosphite yield was 42%. The solution had a pH of 8.4, assayed 8.33% hypophosphite, and contained 0.04% phosphite.

EXAMPLE 2

A quantity of solution was prepared according to Example 1B. The solution on standing and filtering had a pH of 12.3 indicating the presence of hydroxide ions in solution. A 500 ml aliquot of the solution required 0.38 ml of 75.6% phosphoric acid to adjust the pH to 7.0. After filtration, the solution contained 0.93% Ca, 1.9% Na and 8.33% hypophosphite. The solution was evaporated to dryness at 100° C. to 120° C. and found to contain 11.74% solids.

In three separate runs, neutralized and filtered solutions prepared as above were passed through 300 ml of a cation exchange resin charged with sodium ions. The resins used were: (A) Rohm & Haas IR-20 Plus BV sulfonic acid resin, (B) Rohm & Haas IRC-84 carboxylic acid (weak acid) resin, and (C) Dow Chemical CCR-2 carboxylic acid resin. The calcium concentration of successive portions of the solution was determined by atomic absorption spectroscopy and the results appear in Table I.

EXAMPLE 3

A solution was prepared using sufficient commercial calcium hypophosphite and sodium hypophosphite monohydrate to contain 3.5% $Ca(H_2PO_2)_2$ and 8.7% $NaH_2PO_2 \cdot H_2O$. The solution assayed 0.80% Ca. Portions of the solution were passed through ion exchange columns charged with sodium ions. The calcium concentration of successive portions of the solution was determined by atomic absorption spectroscopy. The resins used were: (A) Rohm & Haas IR-20 Plus BV sulfonic acid resin, (B) Rohm & Haas IRC-84 carboxylic (weak acid) resin, and (C) Dow Chemical CCR-2 carboxylic acid resin. The results are presented as Table II.

TABLE I
Purification of Sodium Hypophosphite Solution Neutralized with Phosphoric Acid

| Run | Resin | Incremental Volume Collected (ml) | % Ca | Total Bed Volumes |
|---|---|---|---|---|
| A | Sulfonic Acid (R & H) | 105 | 0.0003 | |
| | | 112 | 0.0037 | |
| | | 70 | 0.012 | |
| | | 110 | 0.029 | |
| | Total | 397 | | 1.4 |
| B | Carboxylic Acid (R & H) | 123 | 0.0009 | |
| | | 214 | 0.0008 | |
| | | 198 | 0.0005 | |
| | | 283 | 0.0007 | |
| | | 202 | 0.0001 | |
| | | 215 | 0.0055 | |
| | Total | 1235 | | 5.5 |
| C | Carboxylic Acid (Dow) | 128 | 0.0001 | |
| | | 286 | 0.0004 | |
| | | 437 | 0.0012 | |
| | | 340 | 0.0046 | |
| | | 251 | 0.2+ | |
| | Total | 1442 | | 7.6 |

Feed solution contained 0.93% Ca, pH adjusted to 7.0

TABLE II
Purification of Sodium Hypophosphite Solution by Ion Exchange Resins

| Run | Resin | Incremental Volume Collected (ml) | % Ca | Total Bed Volumes |
|---|---|---|---|---|
| A | Sulfonic Acid | 99 | 0.0001 | |
| | | 229 | 0.0091 | |
| | | 80 | 0.012 | |
| | | 91 | 0.025 | |
| | Total | 499 | | 1.7 |
| B | Carboxylic Acid | 280 | 0.0008 | |
| | | 175 | 0.002 | |
| | | 170 | 0.002 | |
| | | 170 | 0.002 | |
| | | 165 | 0.002 | |
| | | 170 | 0.013 | |
| | Total | 1080 | | 5.4 |
| C | Carboxylic Acid | 174 | 0.0008 | |
| | | 392 | 0.0008 | |
| | | 445 | 0.0001 | |
| | | 493 | 0.0002 | |
| | Total | 1720 | | 8.0 |

What is claimed is:

1. A method for producing sodium hypophosphite by reacting elemental phosphorus with aqueous sodium hydroxide in the presence of a sufficient excess of solid calcium hydroxide to convert substantially all of the phosphite ions formed in the reaction to insoluble calcium phosphite whereby a solution of sodium hypophosphite is formed in which excess calcium ions remain in solution as calcium hydroxide and calcium hypophosphite, wherein the improvement comprises:
   (a) adding sufficient phosphoric acid or an acid phosphate salt to the solution of sodium hypophosphite to adjust the pH of the solution to be between 6.5 and 7.0, thereby neutralizing any hydroxide ions in the solution and precipitating the equivalent calcium ions as insoluble calcium phosphate,
   (b) separating the insoluble calcium phosphate from the neutralized solution, and
   (c) contacting the neutralized solution from step (b) with a cation ion exchange resin bearing sodium ions thereby exchanging calcium ions with sodium ions.

2. The process of claim 1 wherein the acid phosphate salt is sodium acid pyrophosphate.

3. The process of claim 1 wherein the acid phosphate salt is sodium dihydrogen phosphate.

4. The process of claim 1, 2, or 3 wherein the elemental phosphorus is commercial yellow phosphorus.

5. The process of claim 4 wherein the ion exchange resin is a sulfonic acid ion exchange resin.

6. The process of claim 4 wherein the ion exchange resin is a carboxylic acid ion exchange resin.

7. The process of claim 1, 2, or 3 wherein the elemental phosphorus is in a sludge from an electrothermal phosphorus plant.

8. The process of claim 7 wherein the ion exchange resin is a sulfonic acid ion exchange resin.

9. The process of claim 7 wherein the ion exchange resin is a carboxylic acid ion exchange resin.

10. A process of purifying a solution containing sodium, hypophosphite, calcium, and hydroxide ions comprising:
    (a) adding sufficient phosphoric acid or an acid phosphate salt to adjust the pH of the solution to between 6.5 and 7.0 thereby neutralizing the hydroxide ions in solution and precipitating the equivalent calcium ions as an insoluble calcium phosphate,
    (b) separating the insoluble calcium phosphate from the neutralized solution, and
    (c) contacting the neutralized solution with a cation ion exchange resin bearing sodium ions thereby exchanging the calcium ions with sodium ions.

11. The process of claim 10 wherein the acid phosphate salt is sodium acid pyrophosphate.

12. The process of claim 10 wherein the acid phosphate salt is sodium dihydrogen phosphate.

13. The process of claim 10, 11, or 12 wherein the ion exchange resin is a sulfonic acid ion exchange resin.

14. The process of claim 10, 11, or 12 wherein the ion exchange resin is a carboxylic acid ion exchange resin.

* * * * *